United States Patent [19]
Hirota et al.

[11] Patent Number: 5,825,365
[45] Date of Patent: Oct. 20, 1998

[54] THREE-DIMENSIONAL GRAPHIC APPARATUS SIMPLIFYING NEIGHBORING ARRANGEMENT

[75] Inventors: Katsuhiko Hirota, Nagano; Hiroshi Kamada; Kaori Suzuki, both of Kawasaki; Atsuko Tada; Asako Yumoto, both of Kawasaki; Satoshi Kasai; Kazumi Shibata, both of Shizuoka, all of Japan

[73] Assignee: Fujitsu Limited, Kawasaki, Japan

[21] Appl. No.: 595,656

[22] Filed: Feb. 2, 1996

[30] Foreign Application Priority Data

Feb. 3, 1995 [JP] Japan ................................. 7-016765

[51] Int. Cl.$^6$ .................................................. G06T 17/40
[52] U.S. Cl. ...................... 345/433; 345/419; 364/468.03
[58] Field of Search .................................... 345/418–420, 345/427, 433–438, 440–442; 364/468.03, 468.04, 468.09, 468.1, 474.24, 574

[56] References Cited

U.S. PATENT DOCUMENTS

| | | | |
|---|---|---|---|
| 5,463,722 | 10/1995 | Venoltia ................................. | 345/433 |
| 5,490,241 | 2/1996 | Mallgren et al. ....................... | 345/140 |
| 5,588,098 | 12/1996 | Chen et al. ............................. | 345/437 |
| 5,642,475 | 6/1997 | Itoh et al. .............................. | 345/433 |

OTHER PUBLICATIONS

Johnson, Timothy E., "Vellum pushes 3–D envelope", (Software Review) *MacWEEK*, v6, n3, p3(2), Jan. 20, 1992.
Johnson, Timothy E., "Ashlar pushes Vellum into 3–D", (Software Review) *MacWEEK*, v5, n36, p42(1), Oct. 22, 1991.
"3D/Eye TriSpectives delivers the first complete desktop 3D solution", (Product Announcement) Business Wire, Ithaca, N.Y., Oct.24, 1995.

*Primary Examiner*—Rudolph J. Buchel, Jr.
*Attorney, Agent, or Firm*—Staas & Halsey

[57] ABSTRACT

A three-dimensional graphic apparatus generates a three-dimensional image using computer graphics, in which the positional relationship between matters, such as furniture in a three-dimensional image, can be changed readily and accurately. A moving object indication unit indicates one of the matters in the three-dimensional image as an object matter. A search direction indication unit indicates a search direction of a base polygon constituting a base matter coming into contact with the object matter, from a notice point of a line of sight. A base polygon search unit selects, from among polygons located on a straight line extending from the notice point in the search direction, a polygon closest to the notice point as the base polygon. An object polygon selection unit selects an object polygon, which is a polygon to be brought into contact, from among polygons constituting the object matter. A neighboring unit rotates the object matter so that the object polygon will be parallel to the base polygon and moves the object matter so that the object polygon will be parallel to the base polygon and moves the object matter so that the object polygon and the base polygon lie on the same plane.

9 Claims, 21 Drawing Sheets

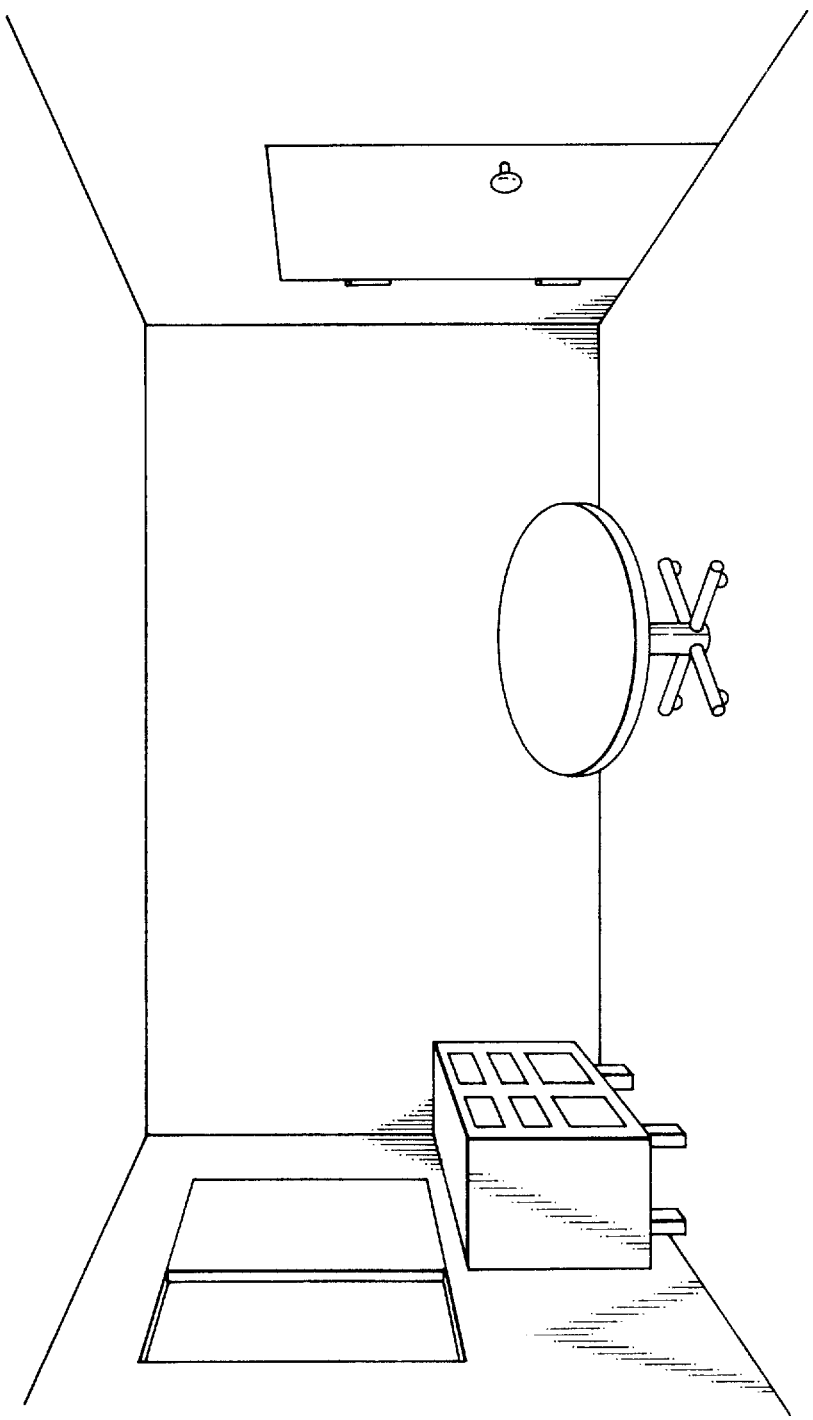

x : 12.92
y : 23.56
z : 2.45

APICES : APEX1 ; X1, Y1, Z1
APEX2 ; X2, Y2, Z2
⋮
APEXn ; Xn, Yn, Zn

POLYGONS : POLYGON1 ; APICES 1, 2, 3, 4
POLYGON2 ; APICES 3, 4, 5, 6, 7
⋮

THREE-DIMENSIONAL GRAPHIC APPARATUS SIMPLIFYING NEIGHBORING ARRANGEMENT

BACKGROUND OF THE INVENTION

1. Field of the Invention

The present invention relates to a three-dimensional graphic apparatus for generating a three-dimensional image by means of computer graphics. More particularly, this invention is concerned with a three-dimensional graphic apparatus making it possible to readily and accurately change the positional relationship between matters such as furniture in a three-dimensional image depicting a room, or the like, in which furniture is installed.

2. Description of the Related Art

Computer graphics have prevailed among general designers, and various kinds of modeling have been put to use. There is a growing demand for the construction of a more user-friendly user interface.

Three-dimensional shape data of various matters to be employed in computer graphics has been put on the market. In general, the marketed three-dimensional shape data or user-created three-dimensional shape data is used to produce computer graphics. A three-dimensional graphic apparatus is required to include a facility for changing the positions, postures, or sizes of matters constituting an image. For example, when an interior designer negotiates with a customer for the interior decoration of a room or the layout of furniture while looking at a computer graphic, the designer and customer discuss while visually recognizing a predictable situation by modifying the interior decoration or installing existing furniture or locally-procurable furniture using a supplied image of the room. In this case, it is essential that the layout of furniture can be changed easily.

A changing facility executes changing interactively with a user of an apparatus. The currently most popular facility is configured to prompt a user to designate the magnitude of a movement using a mouse. Changing is classified into three modes; parallel moving (hereinafter moving), rotation, and size changing. After any of the modes is selected and designated using a mouse, the specific processing is carried out. Assuming that a matter to be adjusted is to be moved, a user is prompted to select a moving mode after selecting the matter to be adjusted. When the user shifts a mouse, the matter to be adjusted is moved by the quantity of shifting the mouse. Likewise, for rotation or size changing, the specific mode is selected, and the mouse is manipulated. Rotation or size changing is then executed by the quantity of manipulating the mouse.

As mentioned above, a known three-dimensional graphic apparatus is configured so that a user is prompted to designate the magnitude of a change in position, posture, or size of a matter constituting a virtual world by shifting a mouse or the like. However, since computer graphics displays a three-dimensional image in a two-dimensional screen, a user cannot directly understand how a quantity of shifting a mouse or the like corresponds to a change in shape. The user must therefore adjust a shape on a trial-and-error basis in comparison with other shapes.

For changing the layout of furniture in a room, a neighboring arrangement, such as installation of furniture against a wall, is often adopted. For the neighboring arrangement, furniture is rotated so that the plane of the furniture to be abutted against the wall will be parallel the wall, and then the furniture is moved so that the two planes will coincide with each other. In computer graphics, generally, the surface of a matter is represented as a set of polygons. After a plane to be brought into contact is designated, the above processing is executed. However, it is rather difficult to move a matter using a mouse or to directly understand the magnitude of a rotation or the like. At present, there is difficulty in making two contact planes coincide with each other accurately.

In an effort to solve the foregoing problem, a three-dimensional graphic apparatus, in which three different views such as a front view, side view, and top view are displayed in place of a three-dimensional image, and a two-dimensional shift made by a mouse is associated with a two-dimensional movement made in any of the three views so that the mouse shift can correspond directly to a movement in a three-dimensional space, has been put to use. This apparatus allows a user to change a positional relationship while observing how two contact planes are overlapping.

However, even in the above case, it must be visually determined whether the two planes are in contact with each other. This poses a problem of accuracy deficiency. As long as planes to be in contact with each other are parallel to each other from the beginning, manipulation is simple. When the planes to be in contact with each other are not parallel to each other, the contact planes must first be rotated in order to make them parallel. After it is visually recognized that the two contact planes are parallel to each other, they are moved. Manipulation is thus complex. Moreover, since it is required to install a facility for displaying three different views, a display must be switched to another display depicting the three views, though it is temporarily. This poses a problem that a user is given a sense of unnaturalness.

A method of inputting numerical values of coordinates is available. However, there is a problem that when rotation is required, calculation of the values becomes very complex.

SUMMARY OF THE INVENTION

As mentioned above, in the known three-dimensional graphic apparatus, it is not easy to change the arrangement of matters in a three-dimensional space. In particular, it is very difficult to accurately move or rotate a matter so that the matter will be arranged to come into contact with another object. An object of the present invention is to realize a three-dimensional graphic apparatus enabling easy execution of a neighboring arrangement such as an arrangement of bringing one matter into contact with another.

A three-dimensional graphic apparatus of the present invention is a three-dimensional graphic apparatus for generating a three-dimensional image by means of computer graphics, comprising: a moving object indication means for indicating one of the matters in a three-dimensional image as an object matter; a search direction indication means for indicating a search direction of a base polygon, which is a polygon of a base matter coming into contact, from a notice point of a line sight; a base polygon search means for selecting the base polygon from among polygons locating on a straight line extended from the notice point in the search direction; an object polygon selection means for selecting an object polygon, which is a polygon to be brought into contact, from among polygons constituting the object matter; and a neighboring means for rotating the object matter so that the object polygon will be parallel a base polygon, and for moving the object matter so that the object polygon and base polygon will lie on the same plane.

In the three-dimensional graphic apparatus of the present invention, after the moving object indication means indicates an object matter to be moved, when the search direction indication means indicates a direction in which the base polygon is searched from the notice point, if a line is extended from the notice point in the indicated search direction, the base polygon search means searches for other polygons coming into contact. The base polygon search means then regards a polygon coming into contact first. In computer graphics, the surface of a matter is represented as a set of polygons. It is determined which of the polygons is to be brought into contact. The indicated object matter is then moved so that it will be arranged to neighbor the base polygon. For a neighboring arrangement, first, the object polygon selection means selects an object polygon, which is a polygon to be brought into contact, from among polygons constituting an object matter. After a polygon to be brought into contact is selected, the object polygon is rotated to be parallel to a base polygon, and then moved so that the two polygons will lie on the same plane. In this state, the two polygons are considered to be in contact with each other. The neighboring means executes this processing. Thus, according to the present invention, once an object matter to be moved and a search direction thereof are designated, a neighboring mate is automatically specified and moved to neighbor the object matter. The manipulation for arranging a matter in a three-dimensional image so that the matter will neighbor another matter can be achieved easily and accurately. Moreover, these kinds of processing can be executed using a perspective view without three different views. Manipulation unrelated to position determination, such as selection of a display screen, can therefore be omitted. The processing can therefore be executed efficiently.

According to the present invention, it is preferred to include an adjustment means for displacing a matter to be moved while retaining a state, in which an object polygon and base polygon lie on the same plane, through interactive processing.

After one matter is arranged to neighbor another, the positions of the matters may have to be adjusted with the state in which the matters neighbor each other retained. This kind of manipulation can be achieved easily owing to the adjustment means.

When the search direction indication means indicates a search direction, a search direction may be selected from among a plurality of directions defined in terms of the direction of a line of sight in a three-dimensional image, or from among a plurality of directions defined in terms of the direction of a line of sight and direction of gravity in a three-dimensional image, or from among a plurality of directions defined in terms of the direction of a line of sight and a world coordinate system in a three-dimensional image.

Various methods of indicating a search direction are conceivable. As long as a search direction can be indicated as mentioned above, manipulation is simple.

The object polygon selection means selects a polygon to be brought into contact, wherein it is preferred that polygons having the shortest distance from a base polygon among polygons constituting an object matter are selected and then a polygon that is nearly parallel to the base polygon is selected from among the polygons. For calculating a distance between polygons, the length of a vertical line extending from an apex of one polygon to another polygon is calculated. The length is calculated relative to all apices. A length of the smallest value is regarded as a distance between polygons. A polygon having the smallest distance is selected as a polygon to be brought into contact. However, since an apex of a polygon may be shared by a plurality of polygons, a plurality of polygons may therefore have the smallest distance. In this case, a polygon that is substantially parallel to the base polygon is selected.

The neighboring means comprises a local coordinate defining means for defining object polygon local coordinates on an object polygon or base polygon local coordinates on a base polygon, a rotating means for rotating the object polygon local coordinates so that coordinate-axis planes corresponding to contact planes and containing the base polygon local coordinates and object polygon local coordinates will parallel each other, and a parallel moving means for moving the rotated object polygon local coordinates in a moving direction so that the coordinate-axis planes will coincide with each other.

BRIEF DESCRIPTION OF THE DRAWINGS

The present invention will be more clearly understood from the description as set forth below, with reference to the accompanying drawings, wherein:

FIG. 1 shows an example of a display of a three-dimensional image produced by computer graphics and manipulated by utilizing a facility implemented in a three-dimensional graphic apparatus by the present invention;

DESCRIPTION OF THE PREFERRED EMBODIMENTS

Before proceeding to a detailed description of the preferred embodiments of the present invention, a conventional three-dimensional graphic apparatus will be described below, to allow a clearer understanding of the differences between the present invention and the prior art.

FIG. 1 shows an example of a display of a three-dimensional image produced by computer graphics, wherein an image depicting the inside of a room is shown. It has become a matter of common practice that computer graphics is used to produce a virtual three-dimensional image, and in the image, the interior decoration of a room or the designs of furniture are modified freely or the layout of furniture is changed. For example, in FIG. 1, a cabinet is installed in contact with the wall at a deep end and the left-hand wall. The cabinet may be moved to come into contact with the right-hand wall, or a round table installed in the center of a room may be rearranged to come into contact with a wall. Thus, a situation in which the layout of furniture is changed can be observed virtually. For this virtual observation, the layout of furniture must be changed easily. The present invention makes it possible to easily perform this kind of processing in a three-dimensional image. The present invention is not limited to an image concerning interior decoration but may apply to any image of a field as long as the image is a three-dimensional image produced by computer graphics.

Figure 2A:
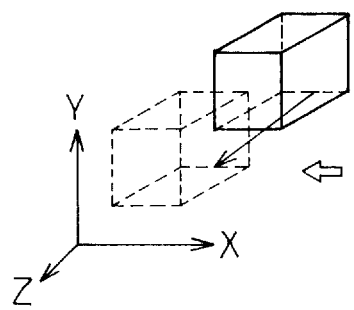
FIGS. 2A to 2C show known manipulations of rearrangement.
Figure 2B:
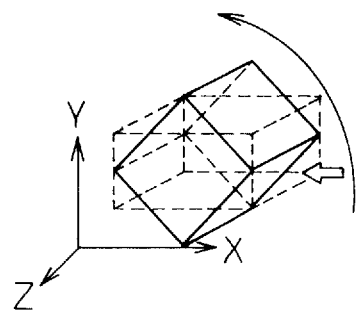
Figure 2C:
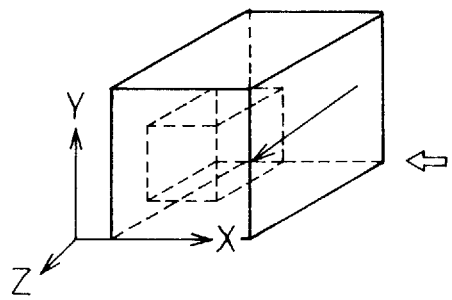

As mentioned above, for changing the arrangement of matters in a three-dimensional image, changing is executed through interaction with a user. What has been widely adopted in the past is the configuration in which a user is prompted to designate the magnitude of a movement or the like using a mouse. Changing is classified into three modes; parallel moving (hereinafter moving), rotation, and size changing. After any of the modes is selected and designated using a mouse, the specific processing is executed. FIGS. 2A to 2C are diagrams for explaining a change of a matter in an image resulting from matter changing executed in respective modes.

In moving mode, as shown in FIG. 2A, when a user shifts a mouse, an object matter moves proportionally to the quantity of shifting. In rotation mode, as shown in FIG. 2B, when a user shifts a mouse, an object matter rotates proportionally to the quantity of shifting. In the mode for changing the size of a matter, as shown in FIG. 2C, when a user shifts a mouse, the size of an object matter changes proportionally to the quantity of shifting. By utilizing the facilities for executing these modes, a matter of a desired size can be arranged at a desired position in a desired posture.

When the aforesaid configuration is adopted, since a shift made by a mouse is associated with a two-dimensional movement made in a screen, it is required to faithfully comply with the magnitude of a movement made in a three-dimensional space. Therefore, assuming that a mouse is shifted with a left button thereof held down, the shifting is judged to define the magnitude of a movement made relative to an X axis in the three-dimensional space. When the mouse is shifted with a middle button thereof held down, the shifting is judged to define the magnitude of a movement made relative to a Y axis in the three-dimensional space. When the mouse is shifted with a right button thereof held down, the shifting is judged to define a quantity of movement relative to a Z axis in the three-dimensional space.

However, in computer graphics, a three-dimensional image is displayed in a two-dimensional screen. A user cannot judge directly how a quantity of shifting a mouse or the like is associated with a change in shape. In the existing circumstances, the user must therefore adjust a shape on a trial-and-error basis in comparison with other shapes. In particular, as shown in FIG. 1, when a neighboring arrangement in which furniture is arranged in contact with walls and which is often adopted, is adopted, the posture and position of one matter must be changed so that two neighboring planes will coincide with each other.

Figure 3A:
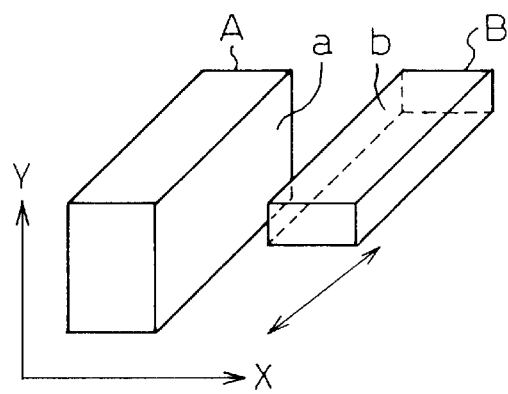
FIGS. 3A to 3C show known examples of composition for neighboring arrangement.

FIG. 3A shows a situation in which a movement is made in a three-dimensional image so that matter B will be contacted with matter A. In FIG. 3A, matters A and B are separated from each other in both X-axis and Z-axis directions. A mouse is manipulated in order to move matter B so that planes a and b will coincide with each other. However, it is difficult to directly judge the magnitude of a movement or rotation induced by a mouse. It is not easy to make two contact planes accurately coincident with each other. When planes to be made coincident are inclined, the manipulation becomes even harder to achieve.

Figure 3B:
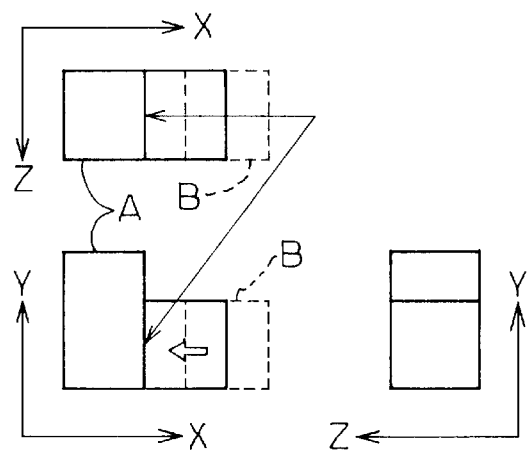

In order to cope with the foregoing problem, as shown in FIG. 3B, three different views such as a front view, side view, and top view are displayed aside from a three-dimensional image. A two-dimensional shift made by a mouse is associated with a two-dimensional movement made in any of the three views, so that the mouse shift will correspond directly to a movement in a three-dimensional space. A three-dimensional graphic apparatus offering this mode has been put to use. This apparatus allows a user to change a positional relationship while observing how two contact planes overlap.

However, even in this mode, it must be judged visually whether or not the planes are in contact with each other. There is therefore a problem of accuracy deficiency. As long as contact planes are parallel to each other from the beginning, manipulation will be simple. However, when contact planes are not parallel to each other, the contact planes must be rotated. Unless it is visually confirmed that the two contact planes have become parallel to each other, a movement cannot be made. This poses a problem that manipulation is complex. In particular, when a plane of a stationary matter to be brought into contact is not parallel to any axial plane, it is very difficult to check if a contact plane of a matter to be moved is parallel to the contact plane of the stationary matter.

Figure 3C:
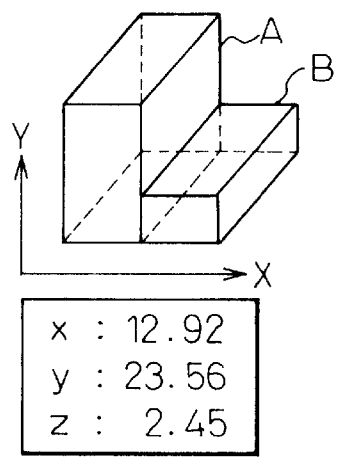

As shown in FIG. 3C, coordinates on the contact plane of the stationary matter are used to calculate after-movement coordinates on the contact plane of the matter to be moved, and to input the calculated coordinates. However, when rotation is required, there arises a problem that calculation of numerical values is quite complex.

Arranging one matter so that the matter will neighbor another is not limited to the installation of furniture in a room but may apply to the composition of a matter of a complex shape by uniting basic units of simple shapes. since this is frequently used processing, it is very important that the processing is simple.

Figure 4:
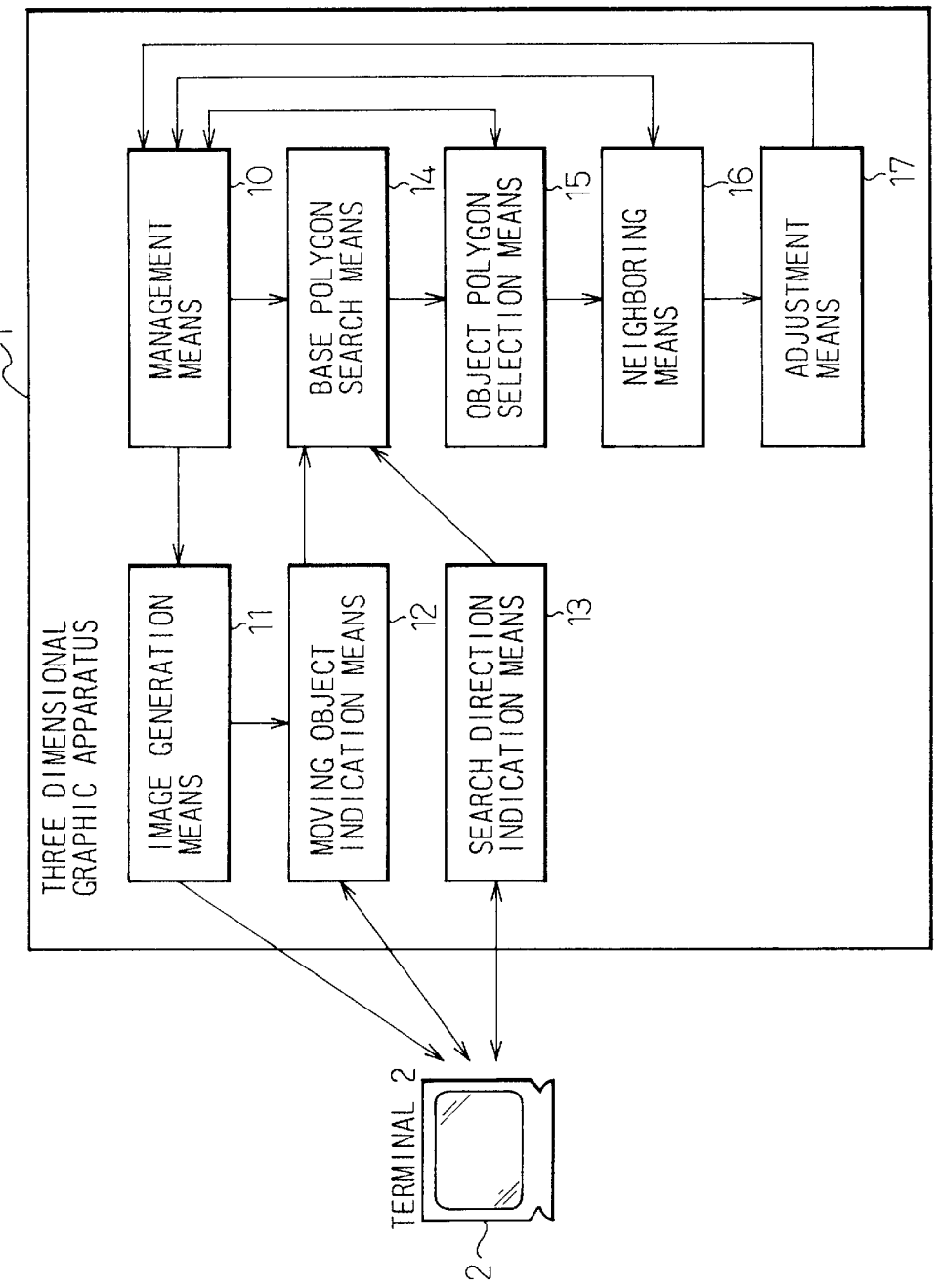
FIG. 4 is a block configuration diagram of a three-dimensional graphic apparatus of an embodiment of the present invention.

FIG. 4 is a block configuration diagram of a three-dimensional graphic apparatus of an embodiment of the present invention.

In FIG. 4, reference numeral 1 denotes a three-dimensional graphic apparatus having the constituent features of the present invention. The three-dimensional graphic apparatus uses computer graphics to generate a three-dimensional image rendering a virtual world. 2 denotes a terminal included in the three-dimensional graphic apparatus 1. The terminal displays a three-dimensional image generated by the three-dimensional graphic apparatus 1 and serves as an interacting means for a user.

The three-dimensional graphic apparatus 1 comprises a management means 10, image generation means 11, moving object indication means 12, search direction indication means 13, base polygon search means 14, object polygon selection means 15, neighboring means 16, and adjustment means 17.

The management means 10 manages data of matters constituting a virtual world which is used for computer graphics (CG). The image generation means 11 uses CG data managed by the management means 10 to generate a three-dimensional image and display it in a display screen of the terminal 2. The moving object indication means 12 selects an object matter, of which the positional relationship is to be changed, from among the matters in a three-dimensional image through interaction with a user. The search direction indication means 13 indicates a search direction of a base polygon through interaction with a user. For indicating a search direction, a direction is selected from among a plurality of directions determined in terms of the line of sight, from among a plurality of directions determined in terms of the line of sight and direction of gravity, or from among a plurality of directions determined in terms of the line of sight and the world coordinates that are coordinates defined in a three-dimensional image.

The base polygon search means 14 searches for another matter, which will neighbor an object matter, on the basis of the object matter indicated by the object indication means 12 and a search direction indicated by the search direction indication means 13, and determines a base polygon, which will come into contact, by searching polygons on a line extended from a notice point in the search direction. The notice point is included in information regarding the line of sight. The object polygon selection means 15 selects an object polygon, which will be brought into contact, from among object polygons constituting the object matter. The neighboring means 16 rotates the object matter so that the object polygon will be parallel to the base polygon, and moves the object matter so that the object polygon and base polygon will lie on the same plane. The adjustment means 17 adjusts the positional relationship between two matters, which are arranged to neighbor each other by the neighboring means 16, while keeping the two matters unseparated through interaction with a user.

A procedure for moving a matter in a three-dimensional image so that the matter will neighbor another matter using the three-dimensional graphic apparatus 1 of this embodiment will be described.

Figure 5:
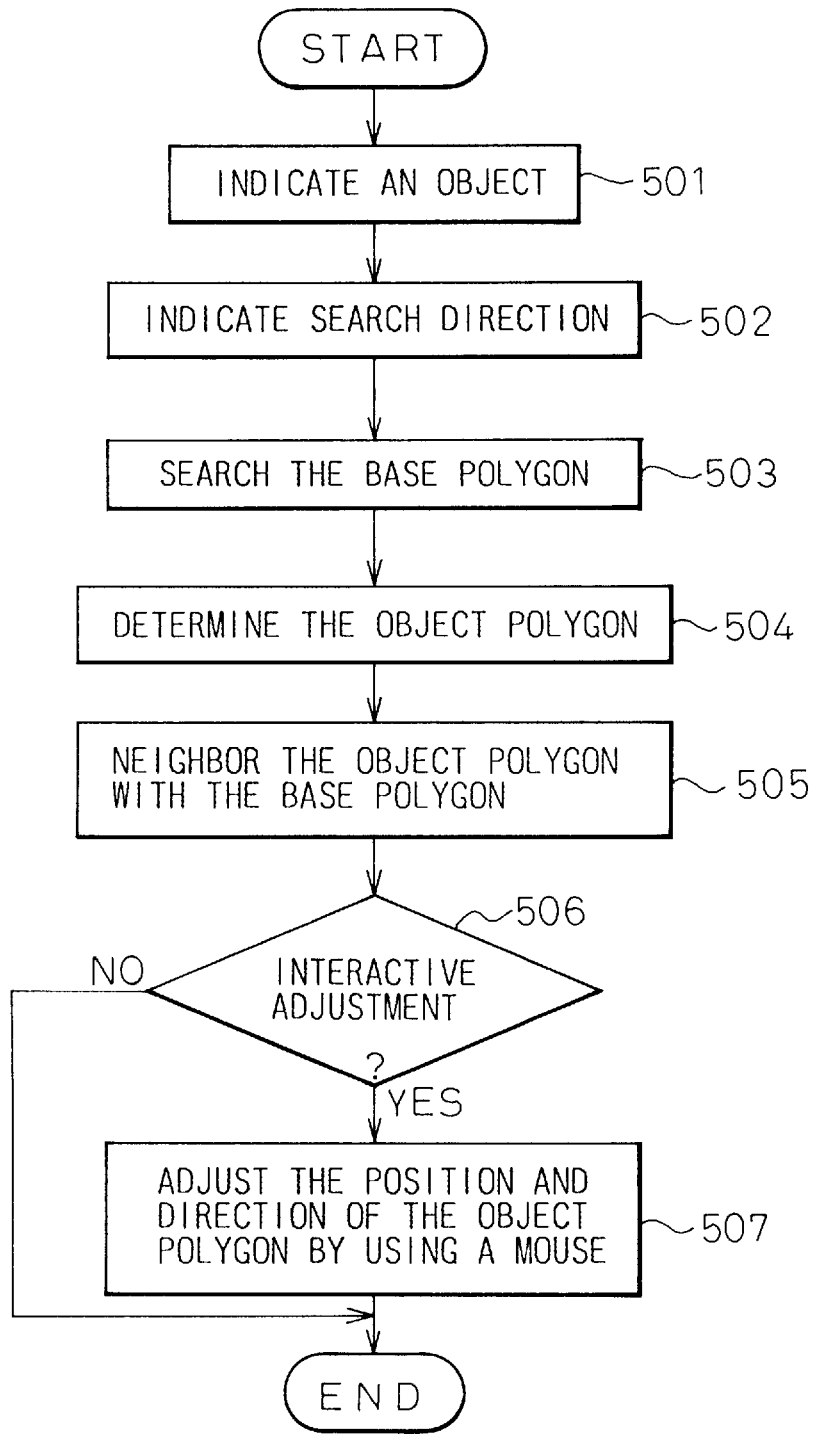
FIG. 5 is a flowchart describing processing to be executed in the three-dimensional graphic apparatus of the embodiment of the present invention.
Figure 6:
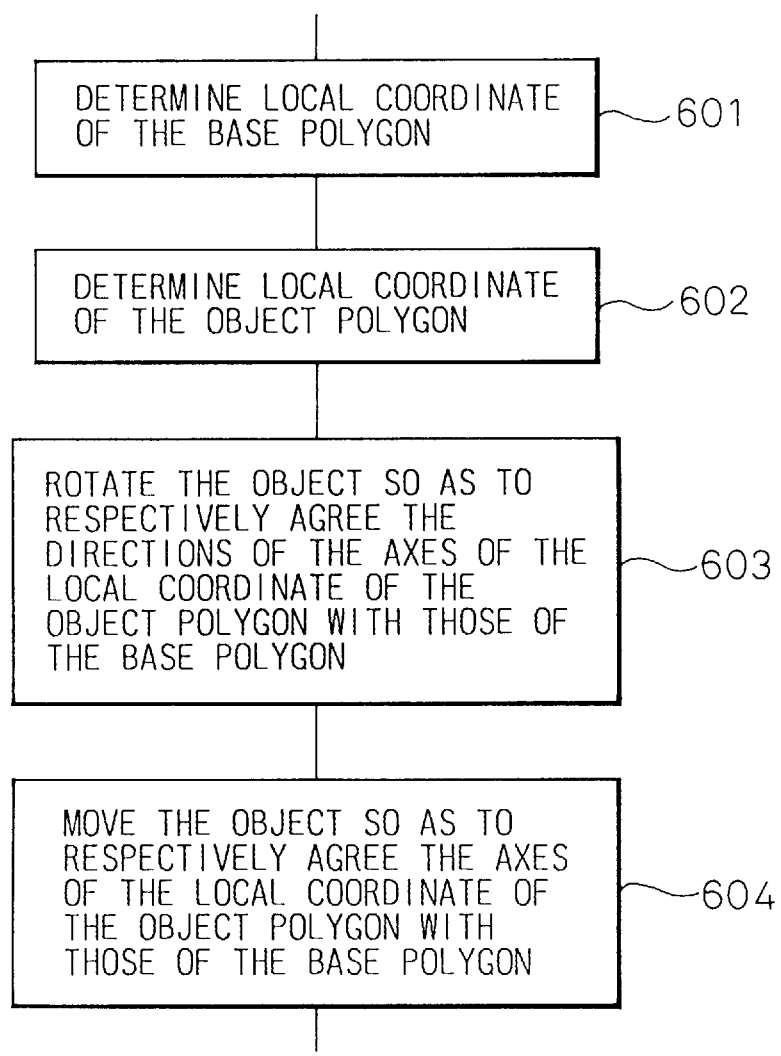
FIG. 6 is a flowchart describing a sequence of neighboring arrangement.
Figure 7:
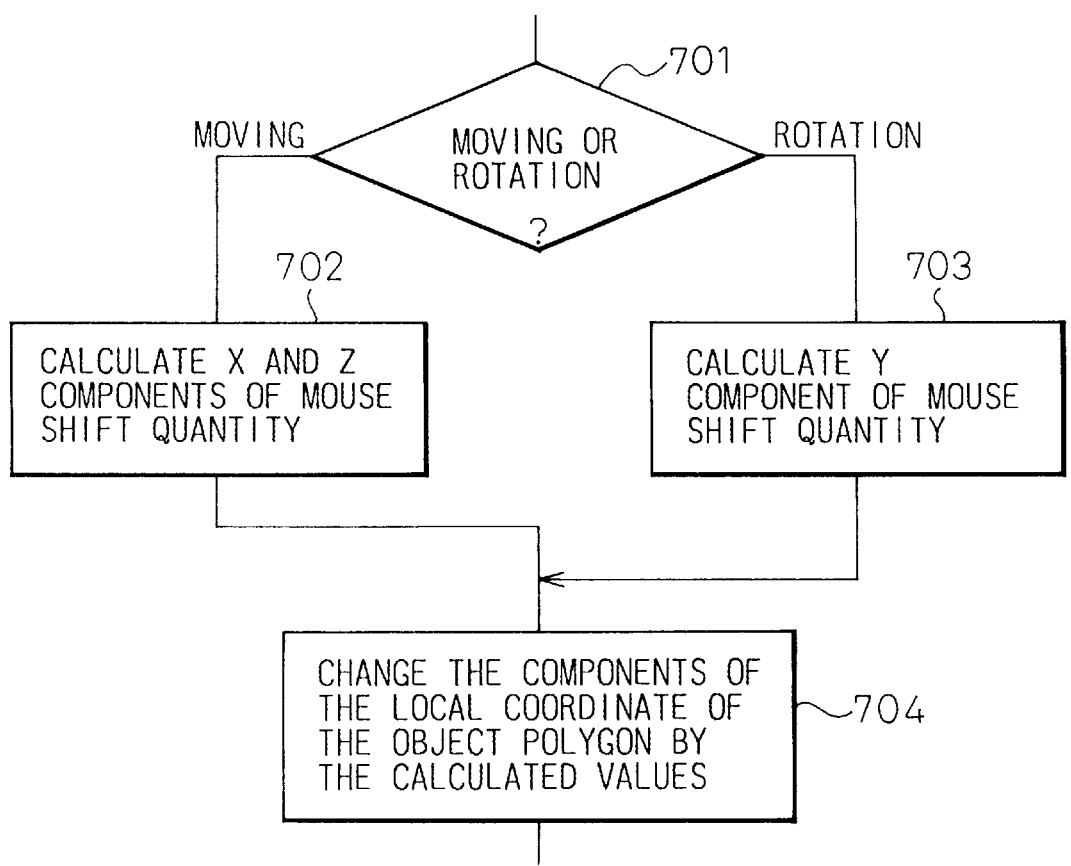
FIG. 7 is a flowchart describing a sequence of adjustment in which a displacement is made with a neighboring state retained.
Figure 8:
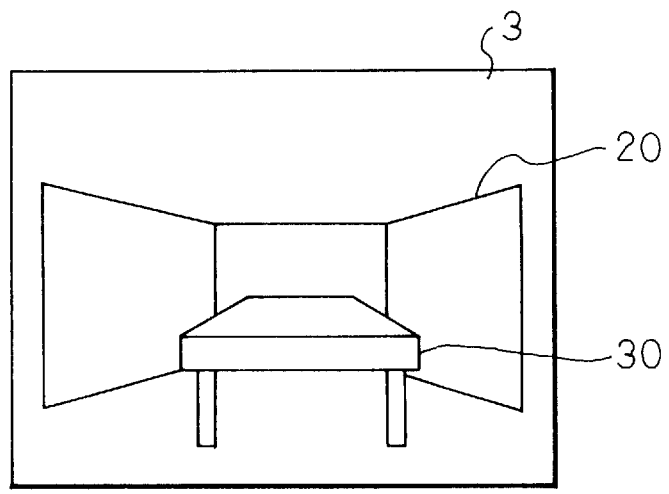
FIG. 8 shows an example of a display in an embodiment.

FIGS. 5 to 7 are flowcharts describing processing to be executed by the three-dimensional graphic apparatus 1. The procedure will be described according to the flowcharts. FIG. 8 shows an example of an image used for explaining a display screen to be changed by manipulation and processing.

Figure 9:
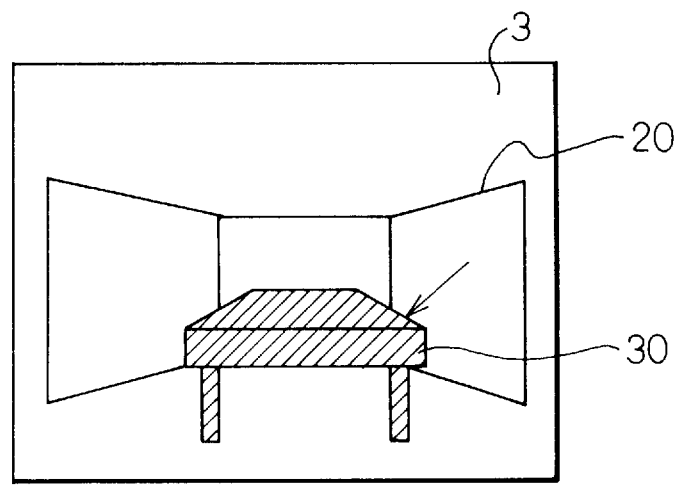
FIG. 9 shows a state in which an object matter to be moved is designated.

In response to an adjustment request concerning the position of a matter in a three-dimensional image which is made by a user, the three-dimensional graphic apparatus 1 first interacts with the user at step 501 in FIG. 5 so as to indicate an object matter whose position is to be adjusted. The indication is, for example, as shown in FIG. 9, executed when the user uses a mouse to click on one of matters in the three-dimensional image appearing in a display screen. In FIG. 9, a table 30 is indicated as an object matter. The display of the table 30 is differentiated from others responsively to the indication, whereby it becomes apparent that the table 30 has been indicated.

Next, at step 502, the search direction of the object matter is selected through interaction with the user. In this embodiment, a method matching human senses of directions such as rightward, leftward, upward, downward, and forward directions is adopted as the way of indicating a search direction. The direction of a line of sight, direction of gravity, or world coordinates defined in a three-dimensional image are used as a criterion for defining the directions.

Figure 10:
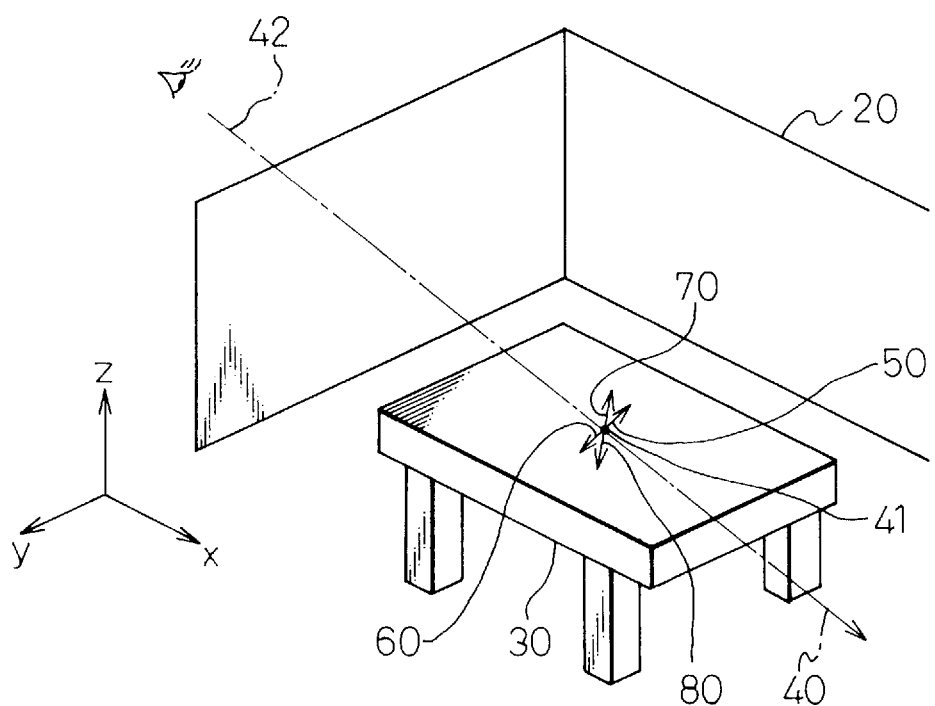
FIG. 10 is a diagram for explaining moving directions determined in terms of the line of sight.
Figure 11A:
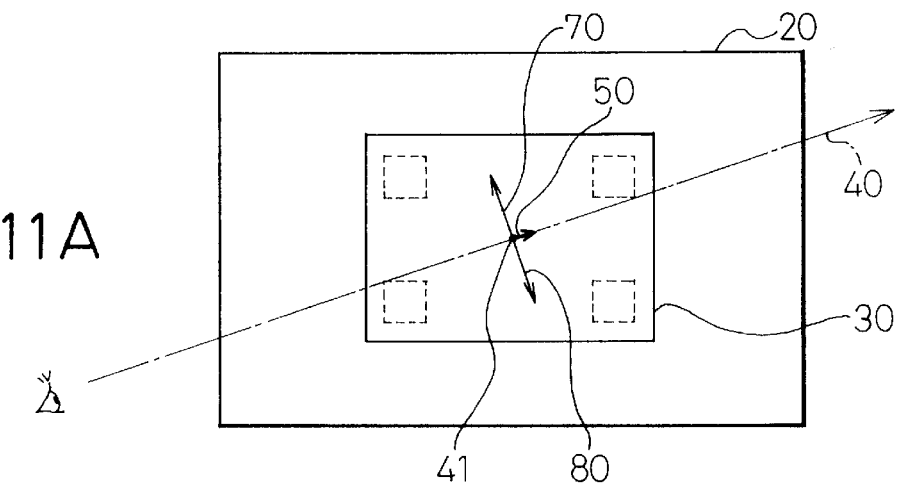
FIGS. 11A to 11C are diagrams in which the line of sight and moving direction explained in FIG. 10 are indicated in three different views.
Figure 11B:
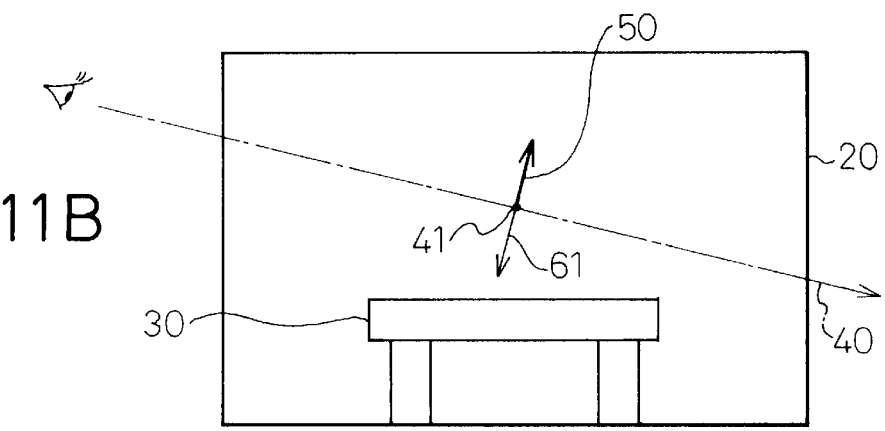
Figure 11C:
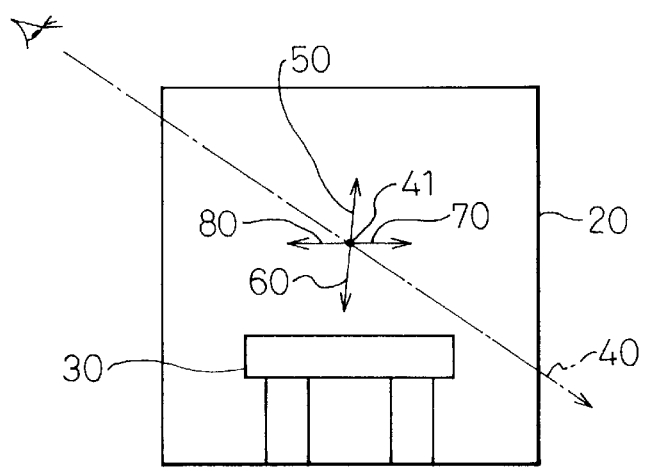

FIG. 10 is a diagram for explaining a composition in which a search direction is selected from among a plurality of directions determined on the basis of the direction of a line of sight. FIGS. 11A to 11C show the direction of a line of sight and a plurality of directions determined on the basis of the direction of a line of sight using three different views.

A line of sight is widely adopted for displaying a three-dimensional image. Information concerning a line of sight includes a view point, notice point, and upward vector. In FIG. 10, reference numeral 40 denotes a line of sight. 41 denotes a notice point. 42 denotes a view point. 50 denotes an upward vector. The view point 42 and notice point 41 lie on the line of sight 40. In other words, a line linking the view point 42 and notice point 41 and extending farther is the line of sight 40. The view point 42, notice point 41 and upward vector 50 can be designated by an user.

A direction extending from the notice point 41 along the line of sight 40 in an opposite direction of the view point 42 is regarded as a forward direction. A direction of the upward vector 50 extending from the notice point 42 is regarded as an upward direction. A direction opposite to the upward vector 50 is regarded as a downward direction. A direction extending leftward from the notice point 41 and perpendicularly to both the line of sight 40 and upward vector 50 is regarded as a leftward direction 70. A direction opposite to the leftward direction is regarded as a rightward direction 80. A user selects any of the directions.

Figure 12:
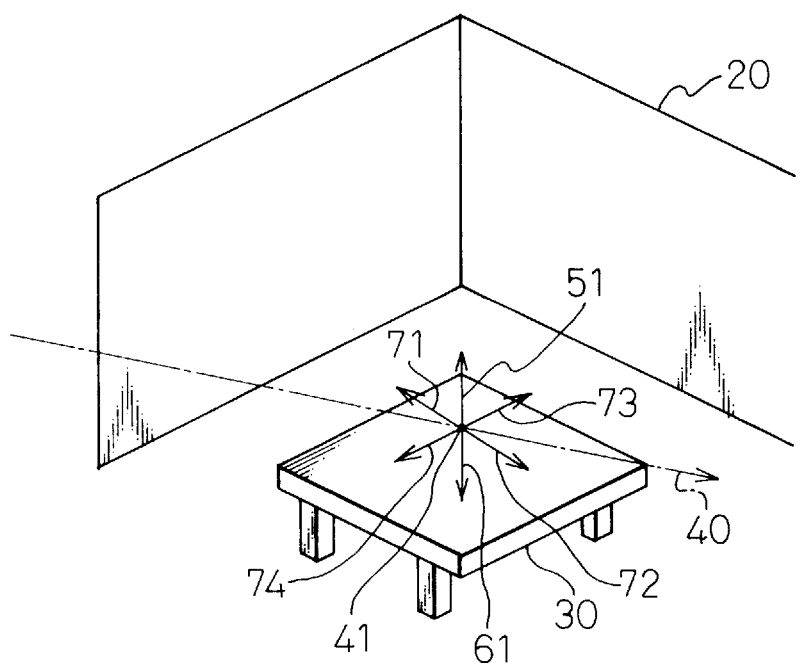
FIG. 12 is a diagram for explaining moving directions determined in terms of the line of sight and the direction of gravity.

In the above example, when a line of sight is inclined relative to a horizontal plane (xy plane), vectors representing "forward," "upward," and "downward" are also inclined relative to the horizontal plane. For a forward, upward, or downward search, it is often preferred that a search is made in a direction parallel or perpendicular to the horizontal plane; that is, a direction perpendicular or parallel to the direction of gravity. From this viewpoint, as shown in FIG. 12, assuming that a notice point on a plane containing vectors whose directions correspond to the directions of a line of sight and gravity is regarded as an origin, the direction of gravity may be defined as a downward direction, a direction opposite to the downward direction may be defined as an upward direction, a direction perpendicular to the direction of gravity and extending forward may be defined as a forward direction, a direction opposite to the forward direction may be defined as a backward direction, a direction perpendicular to the plane and extending leftward may be defined as a leftward direction, a direction opposite to the leftward direction may be defined as a rightward direction. A search direction may then be designated by selecting any of these directions.

In a three-dimensional image, as shown in FIG. 10, world coordinates xyz are defined. A search direction may be designated by selecting any of the axial directions. Aside from these examples, various definitions of search directions are conceivable.

For indicating a direction, names of a plurality of directions defined as mentioned above are, for example, displayed in the form of a list in a display screen. A user is prompted to designate any of the names by clicking on it using a mouse. Thus, an object matter and search direction are indicated.

When an object matter and search directions are indicated as mentioned above, a base polygon that will neighbor the object matter is searched for and determined.

Figure 13:
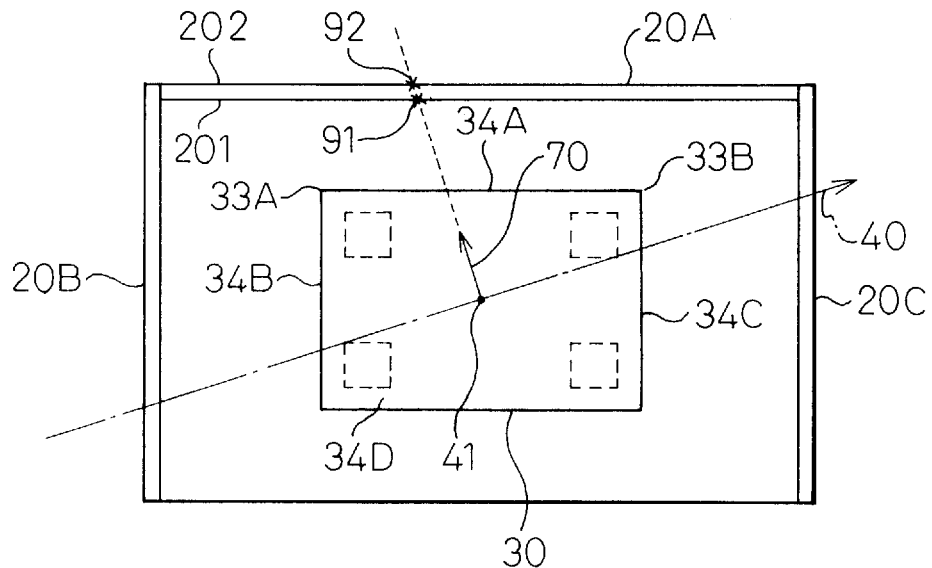
FIG. 13 is a diagram for explaining the processing for determining a base polygon and object polygon.

FIG. 13 is a diagram for explaining how to search for a base polygon. Herein, search directions shown in FIG. 10 shall have been defined, and FIG. 13 shall be a top view equivalent to FIG. 11A.

Figures 25, 26:
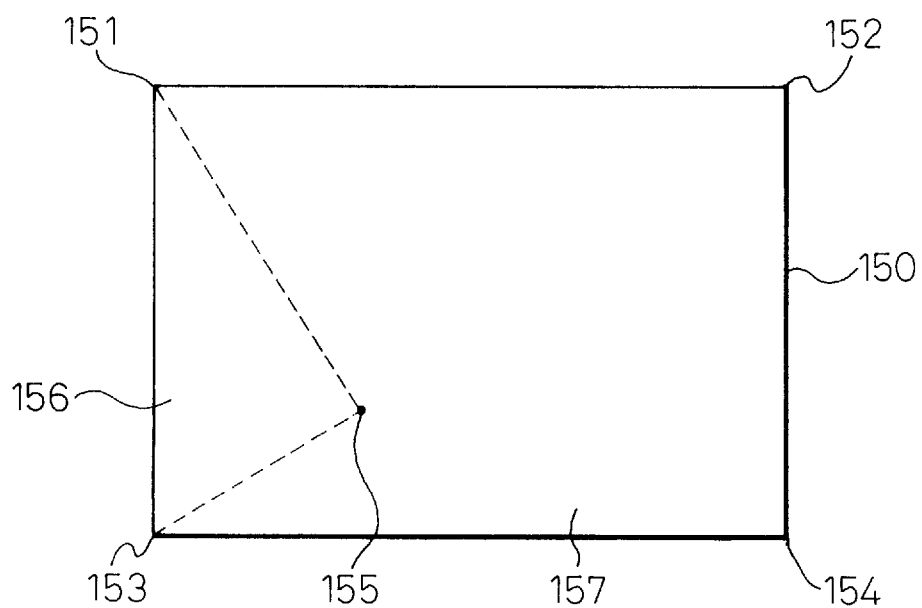
FIG. 25 is a diagram showing an example of definition of a matter.
FIG. 26 is a diagram for explaining a method to define a new origin.

As already described, in computer graphics, the surface of every matter is composed of a set of a plurality of polygons. For example, FIG. 25 shows an example of definition of a matter. As shown in FIG. 25, all apices constituting of the matter are listed up and each polygon constituting of the matter is represented by a set of apices constituting the polygon. Generally speaking, a first apex of the set of apices in an origin.

In FIG. 13, walls are defined as matters 20A, 20B, and 20C each of which is composed of a set of quadrangles. As shown in FIG. 13, when a search direction is determined as "leftward," a line 70 extending in search direction 70 on the left side of the notice point 41 intersects two quadrangles 201 and 202 serving as the front and back sides of the wall 20A at points 91 and 92. In reality, it is checked if a line extending in a search direction on the left side of the notice point 41 intersects all polygons existing in a three-dimensional image. The intersections are calculated. A method of calculating the intersections is well known. The description of the method will therefore be omitted. For faster computation, polygons existing on the right side of a line of sight may be excluded from objects of computation. A polygon containing an intersection that lies closest to the notice point among all the thus-calculated intersections is determined as a base polygon. In FIG. 13, the quadrangle 201 containing the point 91 is regarded as a base polygon.

For determining a base polygon, a polygon intersecting a line extending from the notice point 41 in a search direction is searched for. Note that when the notice point 41 is shifted, a base polygon can be changed from one polygon to another. This will be described later.

Next, at step 504, an object polygon that will be brought into contact with the base polygon is determined by selecting any of polygons constituting the object matter 30. For this determination, distances of all the polygons constituting the object matter 30 from the base polygon 201 are calculated. As for a distance between polygons, lengths of vertical lines extending from all apices constituting a polygon to another polygon are calculated, and then a length of the smallest value is regarded as the distance between polygons. As for polygons constituting the surface of a matter, adjoining polygons may share the same apex. A plurality of polygons may therefore have the same distance from the base polygon 201. For example, when a quadrangle 30A constituting the object matter 30 is parallel to the base polygon 201, apices 33A and 33B have the same distance from the base polygon 201, and the other two apices have the same distance from the base polygon 201. Five planes including planes 34A, 34B, 34C, and 34D that share the apices 33A and 33B, and other two apices respectively are thought to have the same distance from the base polygon 201. Among the polygons having the same distance from the base polygon 201, a polygon that is substantially parallel to the base polygon 201 is selected as an object polygon. In FIG. 13, since the polygon 34A is parallel to the base polygon 201, the polygon 34A is selected as an object polygon.

Figure 14:
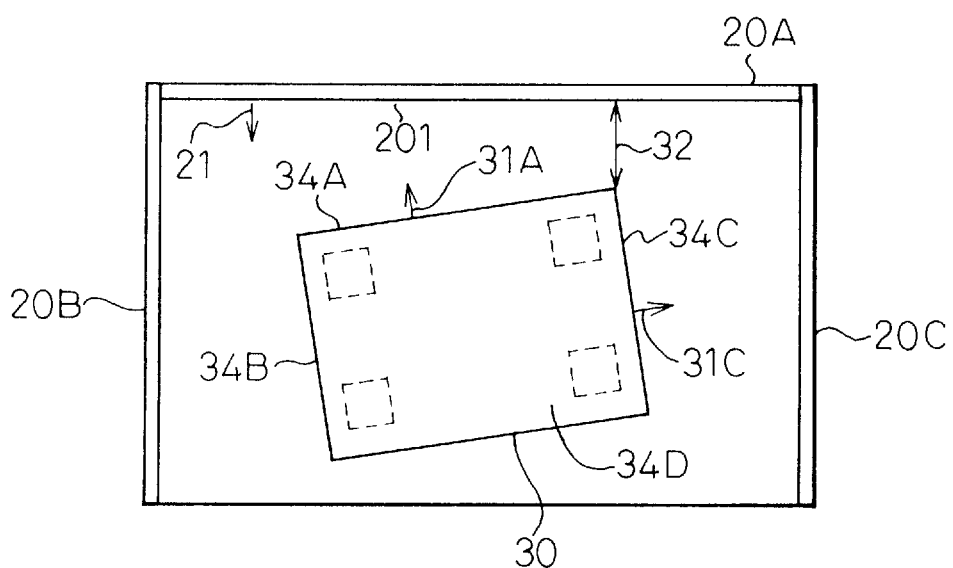
FIG. 14 is a diagram for explaining the processing for determining an object polygon.

FIG. 14 shows a composition in which the object matter 30, which is the same as the one shown in FIG. 13, is inclined relative to the base polygon 201. In this composition, the distance from the apex 33B to the base polygon 201 is the shortest. The distances of four planes except the plane 34C are the shortest. Which of the planes is nearly parallel to the base polygon 201 is determined by calculating the inner products of normal vectors of respective polygons. A parallel polygon has the largest inner product. A perpendicular polygon has an inner product of zero. Specifically, the inner products between a normal vector 21 of the base polygon 201 and normal vectors 31A and 31C and the like of the polygons 34A and 34C and the like respectively are calculated. In FIG. 14, the polygon 34A is selected as an object polygon.

At step 505, the object polygon is moved to the base polygon.

FIG. 6 is a flowchart describing the processing of step 505 in more detail.

Figure 15:
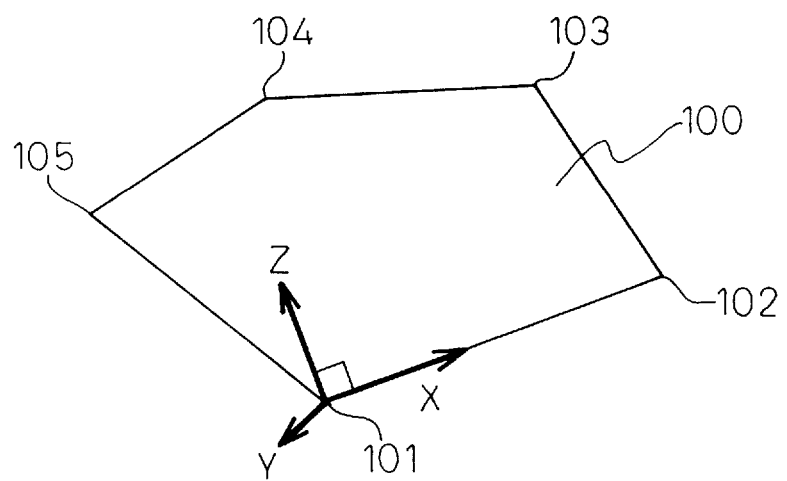
FIG. 15 is a diagram for explaining how to define a local coordinate system on a polygon.

At steps 601 and 602, a local coordinate system is defined on each of the base polygon and object polygon. Definition of a local coordinate system will be described with reference to FIG. 15. Reference numeral 100 denotes a polygon. 101 to 105 denote apices. Needless to say, the apices exist on the same plane.

The simplest method of defining a local coordinate system on a polygon is such that a first apex 101 of the apices constituting a polygon is regarded as an origin, a line segment linking the first apex 101 and a second apex 102 is regarded as an X axis, a Y axis is defined in a normal direction of the polygon at the first point 101, and a vector representing the outer product between the X and Y axes is regarded as a Z axis. However, the direction of the Z axis is opposite between an object polygon and base polygon.

At step 603, the direction of a local coordinate system on the object polygon is agreed with that of a local coordinate system on the base polygon. At step 604, a movement is made so that the origins of two local coordinate systems agree with each other.

Figure 16A:
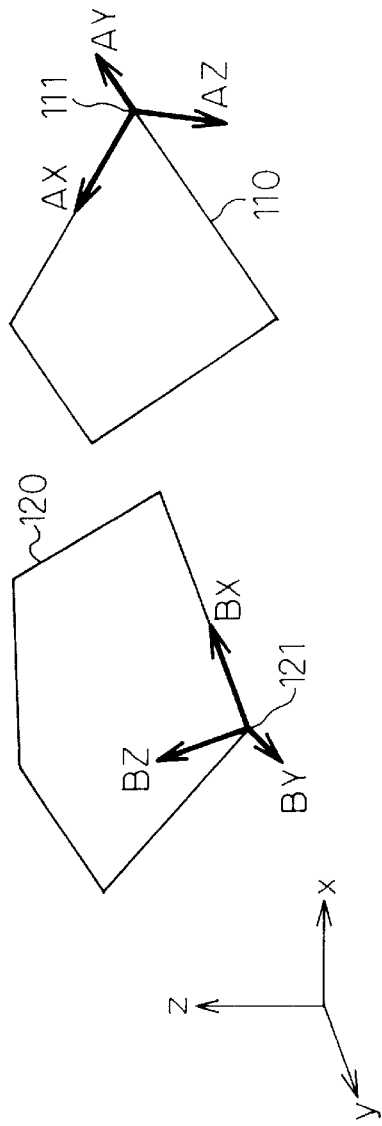
FIGS. 16A to 16C are diagrams for explaining the processing for agreeing local coordinate systems on two polygons.
Figure 16C:
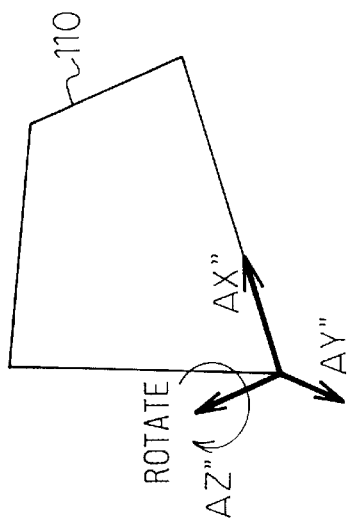
Figure 16B:
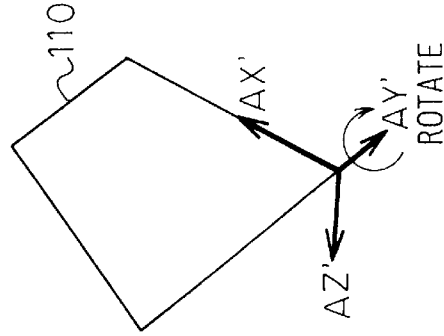

FIGS. 16A to 16C are diagrams for explaining the processing to make a local coordinate system on an object polygon agree with that on a base polygon.

As shown in FIG. 16A, after a local coordinate system is defined on each of an object polygon 110 and base polygon 120, the coordinate axes on the object polygon 110 are rotated with an origin (in this case, an apex 111) as a center so that the coordinate axes will agree with those on the base polygon 120. Specifically, as shown in FIG. 16B, the object polygon is rotated about a Y axis AY' so that an X axis AX' will lie on an axial plane defined by an X axis BX and Z axis BZ on the base polygon 120. The object polygon is then rotated about a Z axis AZ", so that an X axis AX" will agree with an X axis BX on the base polygon 120. Thereafter, the object polygon is rotated about the X axis AX" so that a Y axis AY" will agree with the Z axis AZ".

The rotations are, in practice, achieved by creating transformation matrices. That is to say, a transformation matrix employed in rotating a polygon by an angle θ with an X axis as an axis of rotation is provided as expression 1.

$$[T_{rx}] = \begin{bmatrix} 1 & 0 & 0 & 0 \\ 0 & \cos\theta & \sin\theta & 0 \\ 0 & -\sin\theta & \cos\theta & 0 \\ 0 & 0 & 0 & 1 \end{bmatrix} \quad (1)$$

Using the above transformation matrix, before-transformation coordinates (x, y, z) that have not been transformed are transformed into after-transformation coordinates (x', y', z') according to the following expression:

$$[x', y', z', 1] = [x, y, z, 1][T_{rx}] \quad (2)$$

A transformation matrix employed in rotating a polygon by an angle θ with an Y axis as an axis of rotation is provided as expression 3.

$$[T_{ry}] = \begin{bmatrix} \cos\theta & 0 & -\sin\theta & 0 \\ 0 & 1 & 0 & 0 \\ \sin\theta & 0 & \cos\theta & 0 \\ 0 & 0 & 0 & 1 \end{bmatrix} \quad (3)$$

Using the above transformation matrix, before-transformation coordinates (x, y, z) that have not been transformed are transformed into after-transformation coordinates (x', y', z') according to the following expression:

$$[x', y', z', 1] = [x, y, z, 1][T_{ry}] \quad (4)$$

A transformation matrix employed in rotating a polygon by an angle θ with a Z axis as an axis of rotation is provided as expression 5.

$$[T_{rz}] = \begin{bmatrix} \cos\theta & \sin\theta & 0 & 0 \\ -\sin\theta & \cos\theta & 0 & 0 \\ 0 & 0 & 0 & 0 \\ 0 & 0 & 0 & 1 \end{bmatrix} \quad (5)$$

Using the above transformation matrix, before-transformation coordinates (x, y, z) that have not been transformed are transformed into after-transformation coordinates (x', y', z') according to the following expression:

$$[x', y', z', 1] = [x, y, z, 1][T_{rz}] \quad (6)$$

By synthesizing the above transformation matrices, the axial directions of a local coordinate system on an object polygon are made agree with those of a local coordinate system on a base polygon.

Those rotations are applied to coordinates that are defined using each of the apices of an object matter having an object polygon as an origin.

Next, a parallel movement is made so that the origin of local coordinates on an object polygon will agree with that of local coordinates on a base polygon.

A transformation matrix expressing a movement in which the magnitude of a movement in an X-axis direction is $T_x$, the magnitude of a movement in a Y-axis direction is $T_y$, and the magnitude of a movement in a Z-axis direction is $T_z$, is provided as expression (7).

$$[T_t] = \begin{bmatrix} 1 & 0 & 0 & 0 \\ 0 & 1 & 0 & 0 \\ 0 & 0 & 1 & 0 \\ T_x & T_y & T_z & 1 \end{bmatrix} \quad (7)$$

Using the above transformation matrix, before-transformation coordinates (x, y, z) that have not been transformed are transformed into after-transformation coordinates (x', y', z') according to the following expression:

$$[x', y', z', 1] = [x, y, z, 1][T_t] \quad (8)$$

Using this transformation matrix, the local coordinate on an object polygon is made agree with that on a base polygon. Thus, an object matter is arranged to neighbor a base matter.

As described above, each polygon constituting of a matter is represented by a set of apices constituting the polygon, and a first apex of the set is an origin. Therefore, when a base matter is a wall, an origin of a base polygon locates at one end of the wall. Consequently, when the above-mentioned operation is executed to the base polygon constituting the wall, the object matter is moved to be neighbored to the wall at the end. Therefore, the following adjustment is necessary.

After the object polygon is made coincident with the base polygon at step 505 as mentioned above; that is, after the object matter is arranged to neighbor the base matter, it is judged at step 506 whether or not a user has made an adjustment request for the positional relationship between the object matter and base matter through interactive processing. If it is judged that no adjustment request has been made through interactive processing, the processing is terminated. If an adjustment request has been made through interactive processing, control is passed to step 507. In responsive to the designation of a positional relationship made by a user using a mouse, the positional relationship between the object matter and base matter is adjusted under the condition that the object polygon should lie on the base polygon.

FIG. 7 is a flowchart describing the processing of step 507.

After control is passed to step 507, as described in FIG. 7, it is determined at step 701 whether the adjustment request made through interactive processing is concerned with the moving mode or rotation mode. If the request is concerned with the moving mode, control is passed to step 702. If the request is concerned with the rotation mode, control is passed to step 703.

At step 702, a mouse shift quantity or a quantity of shifting a mouse, which is manipulated by a user, is decomposed into axial components parallel to the axes of the local coordinate system on the object polygon. For example, when the object polygon and base polygon are in contact with each other on an XZ plane, a mouse shift quantity manipulated by a user is decomposed into X-axis and Z-axis components.

At step 703, the mouse shift quantity manipulated by a user is decomposed into a component parallel to a coordinate axis orthogonal to the object polygon. For example, when the object polygon and base polygon are in contact with each other on the XZ plane, a mouse shift quantity manipulated by a user is decomposed into a Y-axis component.

Figure 17A:
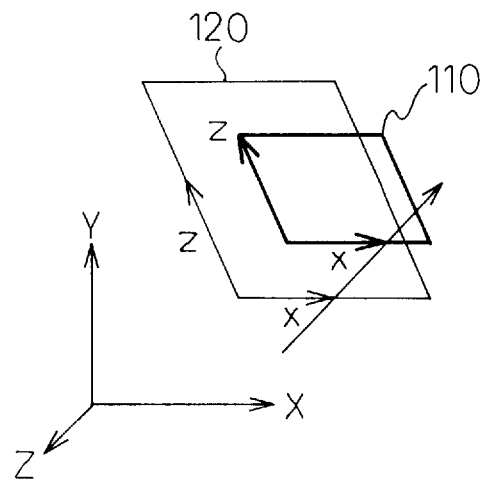
FIGS. 17A and 17B are diagrams for explaining an adjustment in which two polygons are displaced with the neighboring state thereof retained.
Figure 17B:
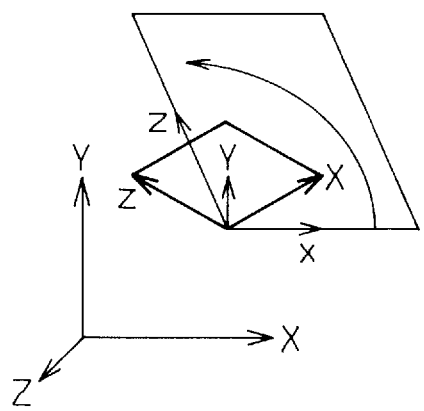

At step 704, based on the decomposed components parallel to the coordinate axes, the positional relationship between the object matter and base matter is adjusted under the condition that the object polygon should lie on the base polygon. When the adjustment request made through interactive processing is concerned with the moving mode, if the object polygon and base polygon are in contact with each other on the XZ plane, as shown in FIG. 17A, the object polygon 110 is moved on the base polygon 120 according to the decomposed X-axis and Z-axis components. When the adjustment request is concerned with the rotation mode, if the object polygon and base polygon are in contact with each other on the XZ plane, as shown in FIG. 17B, the object matter is rotated with the Y axis as an axis of rotation according to the decomposed Y-axis component.

Finally, the transformation matrices synthesized at step 505, and the transformation matrices created in order to comply with the adjustment request made through interactive processing are synthesized on the basis of matrix algebra rules. This results in new transformation matrices. The new transformation matrices are applied to the whole of an object stage, whereby the positional relationship between the object matter and base matter is adjusted.

In the above embodiment, an origin of the base polygon is any one of the apices of the base polygon. Therefore, when the base matter is a wall, the object polygon is moved to be neighbored to the base polygon at one end of the wall before the adjustment. However, such a scene in which the table is arranged at an upper side end of the wall is very curious to a user. This problem is avoided by setting a new origin in the base polygon.

In order to avoid the above problem, a user can newly define a local coordinate system on the base polygon. For example, an origin of the local coordinate system is moved to a point of intersection of the base polygon and a line extended from the notice point in the search direction.

FIG. 26 is a diagram for explaining a method to define a new origin. In FIG. 26, reference numeral 150 designates a base polygon. The base polygon is defined by a set of apices 151, 152, 154, 153. The apex 151 is an origin of the base polygon. When a point 155 is a point of intersection of the base polygon and a line extended from the notice point, the base polygon 150 is divided into two polygons, namely, polygon 156, defined by a set of apices 155, 153 and 151, and polygon 157, defined by a set of apices 155, 151, 152, 154 and 153. Either of the two polygons is selected as the base polygon. In this way, the above-mentioned problem is avoided.

Further, a local coordinate system may be defined so that an X axis is parallel to a line connected between the apices 153 and 154.

The embodiment of the present invention has been described so far. For better understanding of processing to be executed using a three-dimensional graphic apparatus of the present invention, and associated movements of matters in an image, the processing will be described by taking several examples for instance.

Figure 18:
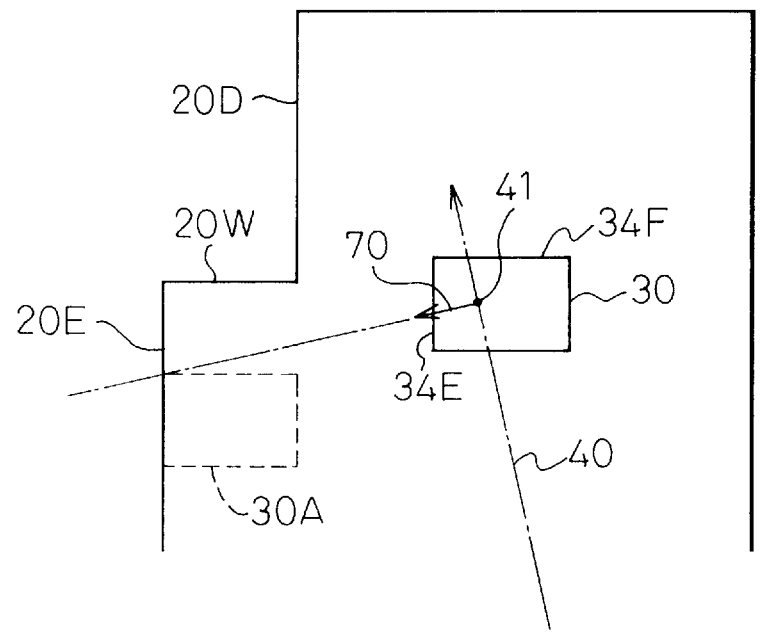
FIG. 18 is a diagram for explaining neighboring arrangement to be executed when a wall is stepped.

FIG. 18 shows an example in which a wall is stepped.

In FIG. 18, a left-hand wall is stepped and composed of walls 20D, 20E, and 20W. As illustrated, the notice point 41 lies on the object matter 30. When a direction on the left side of the notice point 41 is designated, a line extending leftward from the notice point 41 intersects the wall 20E. A polygon constituting the wall 20E is regarded as a base polygon, and a left-hand plane 34E of the object matter 30 is regarded as an object polygon. The object matter 30 is moved so that the polygons will neighbor each other at a point of intersection, and then positioned at 30A. If necessary, the position of the object matter 30 is further adjusted.

Figure 19:
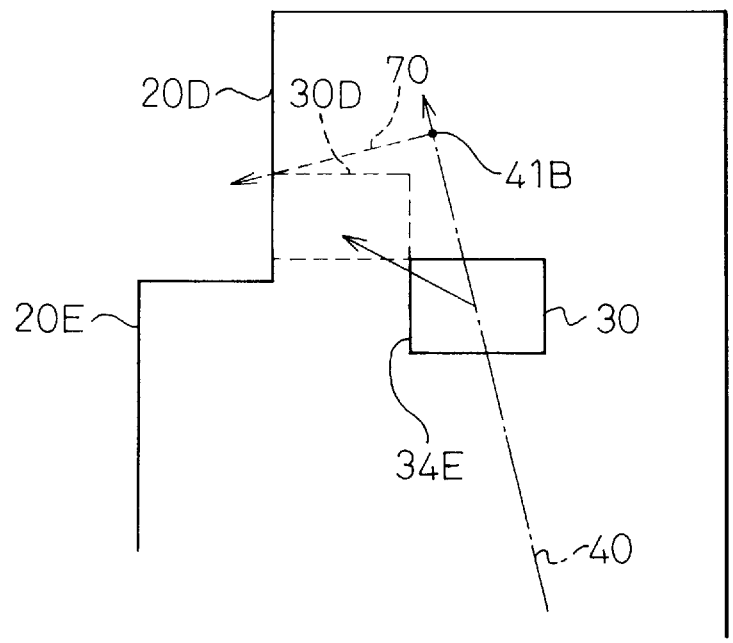
FIG. 19 is a diagram for explaining another neighboring arrangement to be executed when a wall is stepped.

As described in conjunction with FIGS. 10 to 12, a base matter is changed from one matter to another according to a direction derived from information of a view point. The movement of an object matter is varied accordingly. In practice, since "forward," "rightward," "leftward," "upward," or "downward" is determined in terms of the position of a notice point, the search line extended from the notice point can be controlled by varying the position of a notice point. In other words, a base matter to be selected can be changed from one matter to another by varying the notice point 41. FIG. 19 shows examples, in which a base matter is changed by varying a notice point, in the same composition as the one in FIG. 18.

In FIG. 19, the notice point is moved forward from the position in FIG. 18. Even when a direction on the left side of the notice point is regarded as a search direction in the same manner as that in FIG. 18, a line extending leftward from the notice point 41 intersects a wall 20D but does not intersect the wall 20E. A polygon constituting the wall 20D is therefore selected as a base polygon, and the left-hand plane 34E of the object matter 30 is selected as an object polygon.

Figure 20A:
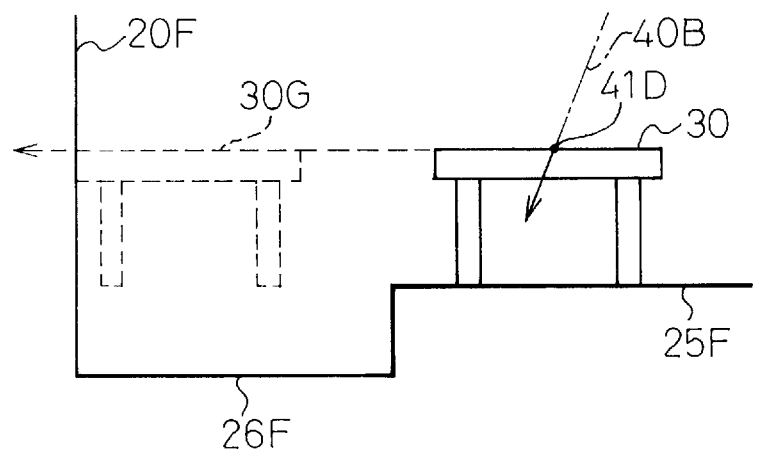
FIGS. 20A and 20B are diagrams for explaining neighboring arrangement to be executed when a floor is stepped.
Figure 20B:
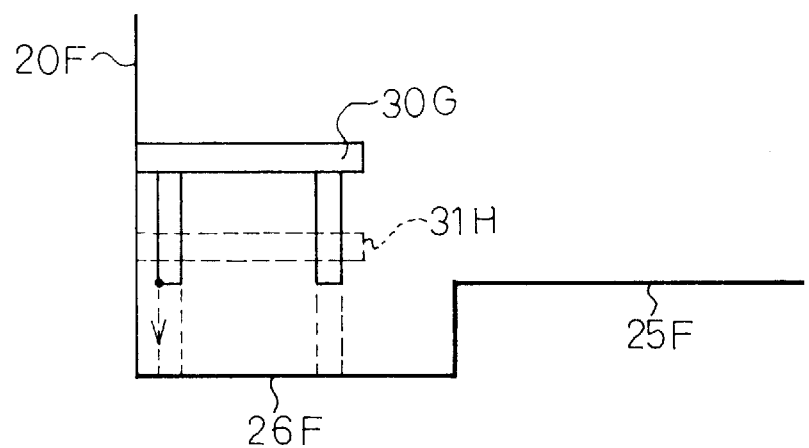

FIGS. 20A and 20B show examples of movements to be made when a floor is stepped.

A floor is stepped and composed of floors 25F and 26F. In this case, the object matter (table) 30 on the floor 25F cannot be placed directly on the floor 26F so that the object matter 30 will be in contact with the wall 20F. That is to say, first, as shown in FIG. 20A, the object matter 30 is moved to neighbor the wall 20F that is regarded as a base polygon. Thereafter, as shown in FIG. 20B, the notice point is moved on a base surface of a leg, and the search direction is changed into a downward direction equivalent to a direction of gravity, then, the base polygon is changed into the floor 26F. The bottoms of legs of the table 30 are regarded as object polygons. The object matter 30 is then moved so that the object polygons will be in contact with the floor 26F. Even in this case, a binding condition cannot be set up because a base polygon is changed from one polygon to another. However, there arises no problem in practice.

FIGS. 21A and 21B, and FIGS. 22A and 22B show examples of processing to be executed when a matter that is, unlike a wall, not a plane is regarded as a base matter.

Figure 21A:
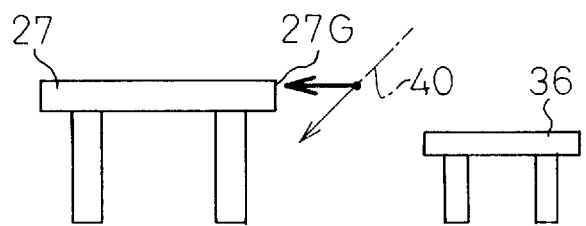
FIGS. 21A and 21B are diagrams for explaining processing to be executed when something other than a wall is regarded as a base matter.
Figure 21B:
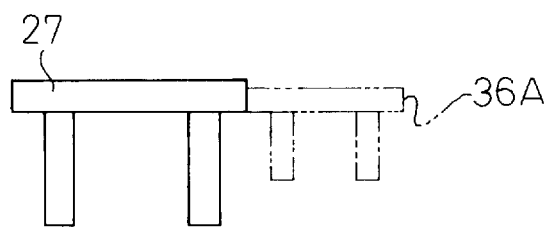

As illustrated, when a small table 36 is to be arranged to neighbor a large table 27, the movement is varied depending on which part of the large table 27 will neighbor the small table 36. In FIG. 21A, a lateral plane 27G of the large table 27 is designated as a base polygon. In this case, the object matter 36 is moved to neighbor a plane extending from the lateral plane 27G. In FIG. 21B, the object matter 36 is moved so that the object matter 36 will neighbor the lateral plane 27H. In the state of FIG. 21B, the small table 36 is floating in the air. This occurs merely in an image, posing no problem. In practical use, it is thought that a rest whose height corresponds to a difference from the floor is placed under the small table. If necessary, the position of the small table is further adjusted.

Figure 22A:
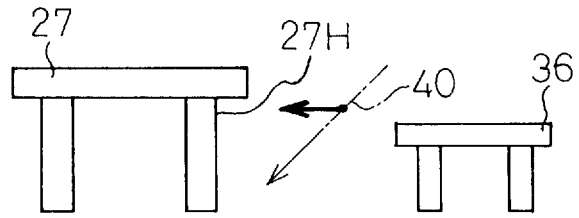
FIGS. 22A and 22B are diagrams for explaining another processing to be executed when something other than a wall is regarded as a base matter.
Figure 22B:
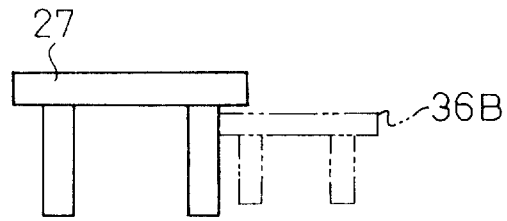

In FIG. 22A, a leg 27H of the large table 27 is designated as a base polygon. In this case, the object matter 36 is moved to neighbor the lateral plane 27H.

The above description has proceeded on the assumption that an object matter is a quadrangle table. In reality, a round table, sphere, or the like is designated as an object matter. As already described, even when this kind of matter is designated, the surface of the matter is represented as a set of polygons. There is therefore a polygon that is closest to and substantially parallel to a base polygon. The polygon is regarded as an object polygon. The aforesaid processing is then executed again.

Figure 23:
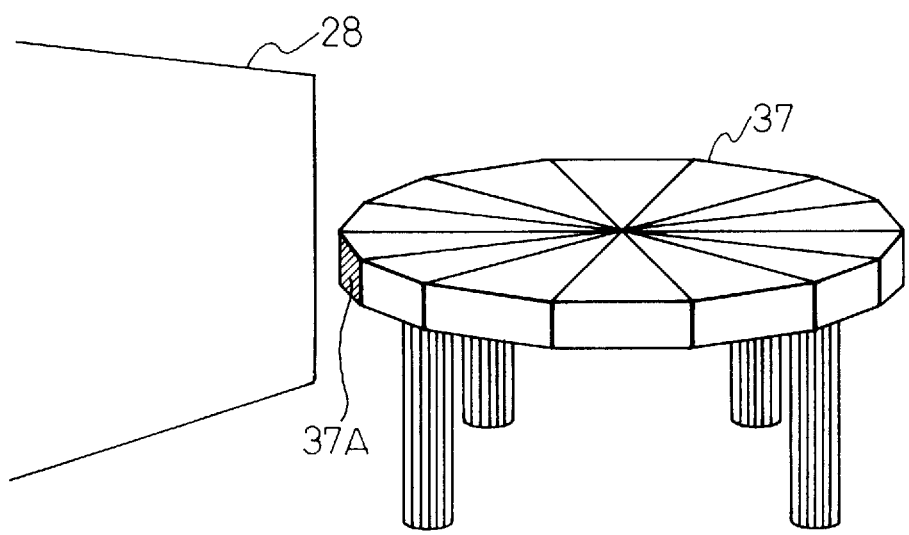
FIG. 23 is a diagram for explaining processing to be executed when an object matter is a round table.

FIG. 23 shows an example in which a round table 37 is moved to neighbor a wall 28. As illustrated, cylinders constituting the table are represented as sets of numerous triangles or quadrangles. Among polygons constituting the table 37, if a polygon that is closest to and parallel to a base polygon comparable to the wall 28 is a polygon 37A, the polygon 37A is regarded as an object polygon. Processing is then executed.

Figure 24:
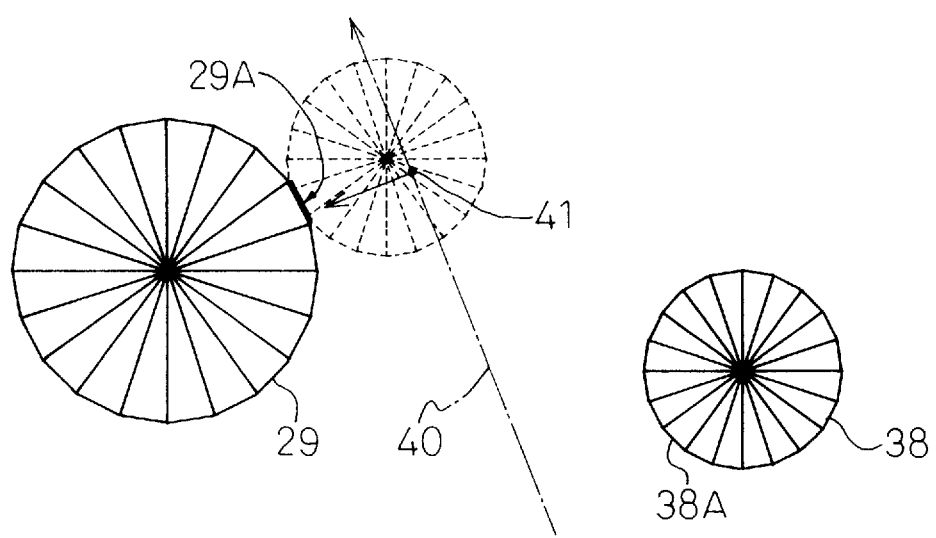
FIG. 24 is a diagram for explaining processing to be executed when both an object matter and base matter are round tables.

There is a possibility that a base matter is not a wall, either. FIG. 24 shows an example in which an object matter is a round table 38 and a base matter is a round table 29. In this case, both the round tables 29 and 38 are sets of polygons. Once a base polygon and object polygon are determined as mentioned above, the aforesaid processing can be executed.

First, a direction on the left side of the notice point 41 is designated, and thus a lateral plane of the table is designated as a base polygon 29A. Among polygons constituting the round table 38, a polygon 38A representing a lateral plane of the table is selected as an object polygon. Even in this case, the round table 38 is moved so that the object polygon 38A will neighbor a virtual plane extending from the base polygon 29A, and then further moved under a binding condition.

As described so far, according to the present invention, a user need not designate a movement with a quantity of shifting a mouse or the like and visually observe how matters are overlapping but should merely designate "Move a so-and-so in which direction." Thus, two matters in a three-dimensional image can accurately be arranged to neighbor each other, and can eventually be united with ease. Moreover, the neighboring arrangement can be executed using a perspective view without three different views. Manipulation unrelated to position determination such as selection of a display screen can therefore be omitted. Manipulation can be carried out efficiently.

For adjusting the positional relationship between two matters that have been arranged to neighbor each other, the positional relationship is adjusted through interaction with a user under the binding condition that the two matters that have been arranged to neighbor each other will not be separated from each other. The user can therefore adjust the positional relationship while grasping what positional relationship is adjusted by manipulating a mouse or the like.

We claim:

1. A three-dimensional graphic apparatus for generating a three-dimensional image by means of computer graphics, comprising:

a moving object indication means for indicating one of matters in a three-dimensional image as an object matter;

a search direction indication means for indicating a search direction of a base polygon, which is a polygon constituting of a base matter coming into contact with said object matter, from a notice point of a line of sight;

a base polygon search means that selects a polygon closest to said notice point as said base polygon from among polygons locating on a straight line extended from said notice point in said search direction;

an object polygon selection means for selecting an object polygon, which is a polygon to be brought into contact, from among polygons constituting said object matter;

a neighboring means for rotating said object matter so that said object polygon will be parallel to said base polygon and for moving said object matter so that said object polygon and said base polygon will lie on the same plane.

2. A three-dimensional graphic apparatus according to claim 1, further comprising an adjustment means for displacing a matter to be moved while retaining a state, in which said object polygon and said base polygon lie on the same plane, through interactive processing.

3. A three-dimensional graphic apparatus according to claim 1, wherein said search direction indication means selects said search direction from among a plurality of directions defined in terms of the direction of a line of sight in said three-dimensional image.

4. A three-dimensional graphic apparatus according to claim 1, wherein said search direction indication means selects said search direction from among a plurality of directions defined in terms of the direction of a line of sight and direction of gravity in said three-dimensional image.

5. A three-dimensional graphic apparatus according to claim 1, wherein said search direction indication means selects said search direction from among a plurality of directions defined in terms of the direction of a line of sight and the world coordinate system in said three-dimensional image.

6. A three-dimensional graphic apparatus according to claim 1, wherein said object polygon selection means selects said object polygon from among polygons constituting said object matter and having the smallest distance from said base polygon.

7. A three-dimensional graphic apparatus according to claim 6, wherein said object polygon selection means selects polygons that are substantially parallel to said base polygon as said object polygon and said base polygon.

8. A three-dimensional graphic apparatus according to claim 1, wherein said neighboring means includes a local coordinate defining means for defining object polygon local coordinates on said object polygon and base polygon local coordinates on said base polygon, a rotating means for rotating said object polygon local coordinates so that coordinate-axis planes corresponding to contact planes and containing said object polygon local coordinates and said base polygon local coordinates respectively will be parallel to each other, and a parallel moving means for moving said rotated object polygon local coordinates in said moving direction so that said coordinate-axis planes will coincide with each other.

9. A three-dimensional graphic apparatus according to claim 8, wherein said neighboring means produces two polygons by dividing said base polygon, each of said two polygons includes a point of intersection of said base polygon and a line extended from said notice point in said search direction as an apex.

* * * * *